(Model.)

W. P. WHITE.
ANIMAL TRAP.

No. 359,237. Patented Mar. 8, 1887.

WITNESSES
Edward J. McDermott
J. K. Smith

INVENTOR
William P. White
by Beattie & Fille,
his attorneys (Model.)

W. P. WHITE.
ANIMAL TRAP.

No. 359,237. Patented Mar. 8, 1887.

2 Sheets—Sheet 2.

WITNESSES
J K Smith
Edward J McDermott

INVENTOR
William P. White
by Beattie & Fike,
his attorneys.

UNITED STATES PATENT OFFICE.

WILLIAM P. WHITE, OF LOUISVILLE, KENTUCKY.

ANIMAL-TRAP.

SPECIFICATION forming part of Letters Patent No. 359,237, dated March 8, 1887.

Application filed July 22, 1886. Serial No. 208,813. (Model.)

*To all whom it may concern:*

Be it known that I, WILLIAM P. WHITE, of Louisville, in the county of Jefferson and State of Kentucky, have invented a new and useful Improvement in Animal-Traps; and I hereby declare the following to be a full, clear, and exact description thereof, reference being had to the accompanying drawings, forming a part of this specification.

Figure 1:
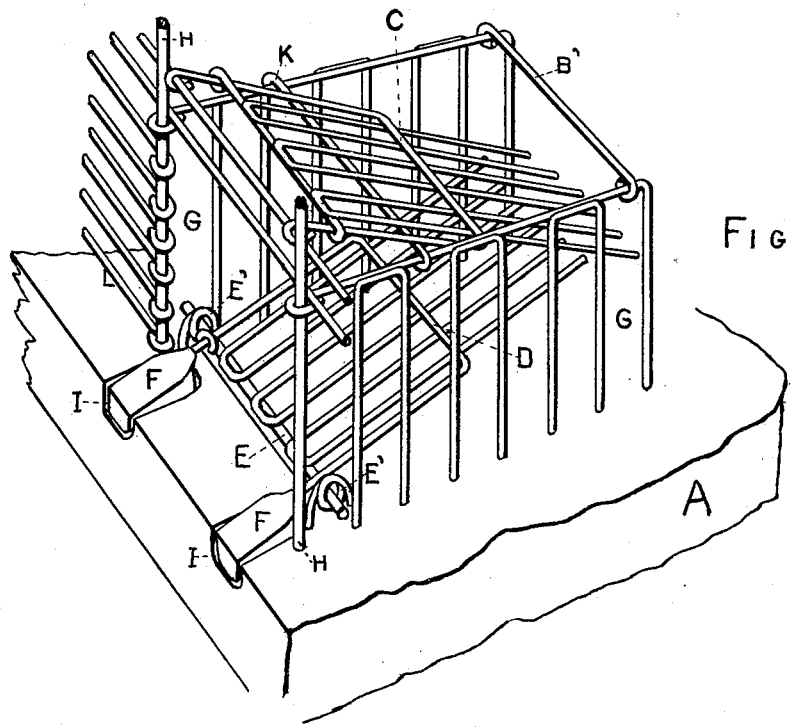
Figure 2:
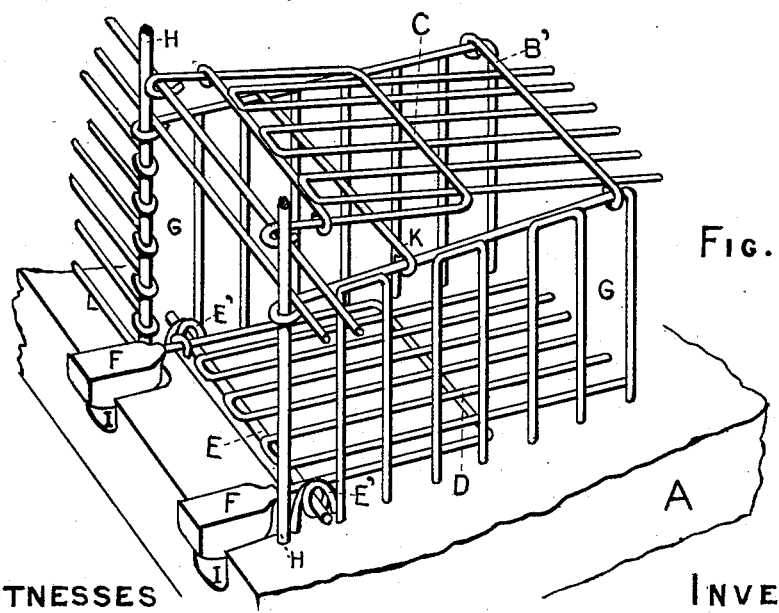
Figure 3:
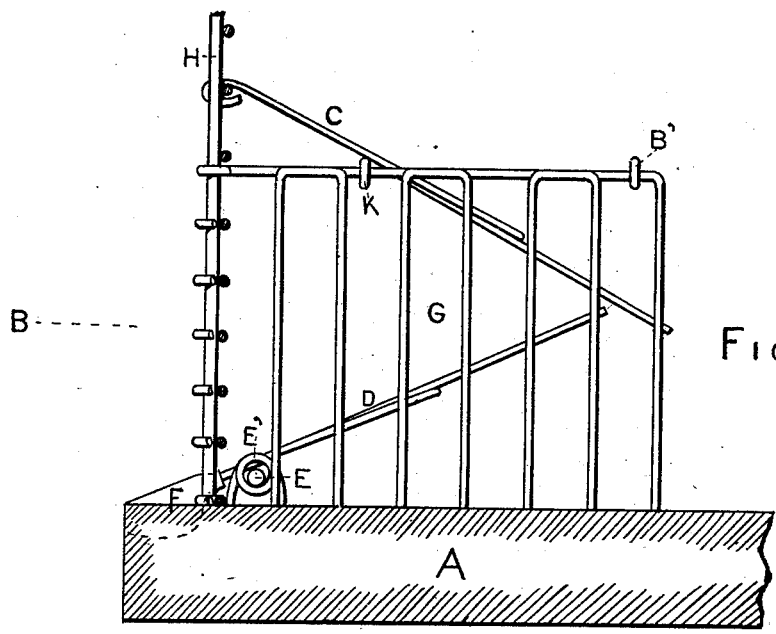
Figure 4:
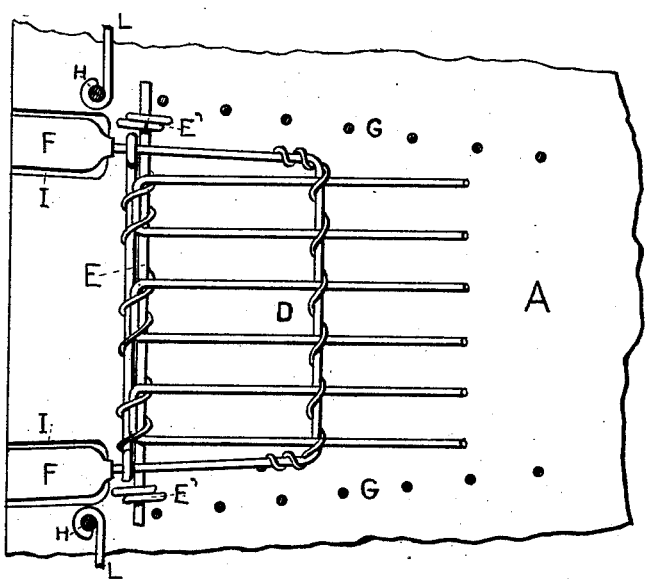

Figure 1 is a perspective of my improvement with the doors closed. Fig. 2 is a perspective of same with the doors open. Fig. 3 is an elevation of same, giving a side view; and Fig. 4 is a plan of the lower door.

In the drawings like letters indicate like parts.

A is the floor of a trap.

B is an entrance-way to the same.

C is an upper vertically-swinging door in the entrance-way, and may be composed of bars and cross-pieces, as shown.

D is a lower vertically-swinging door in the entrance-way, and may be composed of bars and cross-pieces, as shown, and in which the outer cross-piece, E, hinges in the eyes E' E', the door itself being just counterbalanced by the weights F F falling into the depressions I I.

G shows upright bars composing the sides of the entrance-way B.

H shows the upright arcs, and L the bottom arc, of the trap.

B' is the inner cross-piece of the top of the frame forming the entrance-way, and K is a cross-piece in such top on which the upper door, C, rests when closed.

In practice with my improved trap, the upper and lower doors, C and D, are habitually closed, the former inclining downward by its own weight, and prevented by the cross-piece K from reaching the floor of the trap, and the latter held in an upwardly-inclined position by the weights F, which lie in the depressions I sufficiently low to allow the inner portions of the two doors to meet at an angle. The weights F are just heavy enough to keep the lower door, D, in position. I prefer to make the longitudinal bars of the upper door, C, sufficiently long to overlap the like bars of the lower door, D, so that when the former door is raised such bars will strike against the cross-piece B', and thus prevent that door from being raised higher than needful. I also prefer to sharpen or point the inner ends of the longitudinal bars of the upper door, C.

When an animal, attracted by the bait within or other animals already entrapped, seeks to pass into the entrance-way B, as soon as he places his foot on the lower door, D, he separates that door from the upper door, C, and depresses it to the floor A of the trap, thus leaving a free open space before the animal, inviting it to enter. As the animal passes through the entrance-way, if its back comes in contact with the upper door, C, that door is raised sufficiently to allow the animal to pass into the trap. As soon as it does so the two doors resume their habitual closed position, and the ends of the longitudinal bars of the doors, especially of those of the upper one, repel every effort of the animal to escape.

My improved trap can be cheaply manufactured, and is much more attractive, certain, and effective in operation than the ordinary styles of traps in use, and which are furnished with conical entrances, or with a single door inclining from above, and requiring the animal to force an entrance by lifting the door from the floor of the trap.

My improved trap can be used for catching wolves, foxes, minks, weasels, rats, mice, fish, and the like.

I am aware of the existence and use of animal-traps in which the doors are constructed of eccentrically-pivoted individual wires or rods closing vertically by their own weight and operating individually; but my invention differs from such traps in that the doors of my improvement are constructed as of a piece and operate integrally; and, further, that the weights balancing the lower door of my improvement are placed in close juxtaposition to the axis-bar of said door. The practical difficulty of the old style of trap-door described is that an animal can with difficulty only climb over the bar on which the individual wires or rods are pivoted, owing to the height at which such bar is necessarily placed to accommodate the long weight-arms of the wires or rods, and a further difficulty is that the individual movement of the wires or rods confuses and is apt to frighten off an animal attempting to enter. These difficulties my improvement, with its compact integrally-operating doors, presenting simply a moving plane to the animal, is designed to correct.

Having thus fully described my improved trap, what I claim as new and of my invention, and desire to secure by Letters Patent, is—

1. An animal-trap having its entrance-way provided with an upper vertically-swinging door hinged so that it closes outwardly by its own weight, and a lower vertically-swinging door having weights at its outer end, whereby it is normally closed, all the parts of each of said doors being attached and moving in unison with each other, as set forth.

2. An animal-trap having a vertically-swinging gate pivoted in the lower portion of its entrance-way, and having weights at its outer extremity whereby its inner end is caused to normally swing upward and outward, all parts of such gate being connected and operating together, and a co-operating upper gate, which of its own weight swings downward and rests against a stop, which limits its movement, as set forth.

Witness my hand at Louisville, Kentucky, this 19th day of July, 1886.

WILLIAM P. WHITE.

Witnesses:
MICAJAH FIBLE,
JAMES A. BEATTIE.